United States Patent
Yamazaki et al.

(10) Patent No.: US 8,571,260 B2
(45) Date of Patent: Oct. 29, 2013

(54) CHARACTER INPUT APPARATUS AND CHARACTER INPUT METHOD

(75) Inventors: Hitoshi Yamazaki, Koshigaya (JP);
Kazuya Anzawa, Yokohama (JP);
Kentaro Endo, Tokyo (JP); Toshihiko Kamiya, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 841 days.

(21) Appl. No.: 12/473,016

(22) Filed: May 27, 2009

(65) Prior Publication Data

US 2009/0296988 A1    Dec. 3, 2009

(30) Foreign Application Priority Data

May 27, 2008 (JP) ................................ P2008-138360

(51) Int. Cl.
*G06K 9/00* (2006.01)
*G06F 3/041* (2006.01)

(52) U.S. Cl.
USPC .......................................... 382/103; 345/173

(58) Field of Classification Search
USPC ......... 382/100, 103, 115–117, 209, 221, 280, 382/302; 345/156–158, 32, 7–8, 661, 168, 345/173–175; 713/182, 310; 715/700, 863, 715/865–866, 810, 702, 764, 767, 715/856–862; 710/18; 726/16–19; 351/209–210; 342/147, 170; 348/78, 348/169; 705/14.64, 26.1; 707/500

See application file for complete search history.

(56) References Cited

U.S. PATENT DOCUMENTS

| | | | | |
|---|---|---|---|---|
| 6,545,669 B1 * | 4/2003 | Kinawi et al. | | 345/173 |
| 7,013,258 B1 | 3/2006 | Su et al. | | |
| 7,365,738 B2 * | 4/2008 | Molander et al. | | 345/157 |
| 7,561,143 B1 * | 7/2009 | Milekic | | 345/156 |
| 7,730,401 B2 * | 6/2010 | Gillespie et al. | | 715/702 |
| 7,810,050 B2 * | 10/2010 | Hirai et al. | | 715/863 |
| 7,986,816 B1 * | 7/2011 | Hoanca et al. | | 382/115 |
| 2006/0156235 A1 * | 7/2006 | Kanazawa et al. | | 715/700 |
| 2007/0164990 A1 * | 7/2007 | Bjorklund et al. | | 345/156 |

(Continued)

FOREIGN PATENT DOCUMENTS

| EP | 0 844 570 A2 | 5/1998 |
|---|---|---|
| EP | 0 844 570 A3 | 5/1998 |
| JP | 2006-134090 | 5/2006 |
| JP | 2007-52695 | 3/2007 |

OTHER PUBLICATIONS

Office Action issued Jan. 17, 2012, in Japanese Patent Application No. 2008-138360 (with English-language translation).

(Continued)

*Primary Examiner* — Hadi Akhavannik
*Assistant Examiner* — Mehdi Rashidian
(74) *Attorney, Agent, or Firm* — Oblon, Spivak, McClelland, Maier & Neustadt, L.L.P.

(57) ABSTRACT

A character input apparatus includes a liquid crystal monitor 104 which overlappingly displays a character selection screen 101a that displays character selection information for accepting a character input from a user, and a character display area 101b that displays a character selected from the character selection screen 101a; an eye-gaze tracker 201 for detecting a finger of the user by tracking the eye-gaze of the user; and a controller 202 for controlling the liquid crystal monitor 104 so as to display the character display area 101b in a location that accords with the location of the finger detected by the eye-gaze tracker 201.

5 Claims, 11 Drawing Sheets

(56) References Cited

U.S. PATENT DOCUMENTS

| | | | |
|---|---|---|---|
| 2009/0249244 A1* | 10/2009 | Robinson et al. | 715/781 |
| 2010/0275033 A1* | 10/2010 | Gillespie et al. | 713/182 |
| 2010/0275163 A1* | 10/2010 | Gillespie et al. | 715/810 |
| 2011/0197156 A1* | 8/2011 | Strait et al. | 715/771 |
| 2011/0254865 A1* | 10/2011 | Yee et al. | 345/661 |
| 2012/0242581 A1* | 9/2012 | Laubach | 345/168 |
| 2012/0284122 A1* | 11/2012 | Brandis | 705/14.64 |

OTHER PUBLICATIONS

Extended European Search Report Issued Aug. 29, 2012 in Patent Application No. 09161137.6.

* cited by examiner

CHARACTER INPUT APPARATUS AND CHARACTER INPUT METHOD

CROSS-REFERENCE TO RELATED APPLICATIONS

This application is based upon and claims the benefit of priority from prior Japanese Patent Application No. 2008-138360, filed May 27, 2008, the entire contents of which are incorporated herein by reference.

BACKGROUND OF THE INVENTION

1. Field of the Invention

The present invention relates to a character input apparatus and a character input method for inputting characters.

2. Related Background Art

A variety of methods for improving the operability of a character input method for a mobile telephone, which take into account restrictions such as limited space and the fact that most users perform character input with one hand, have been proposed. For example, as a method for enhancing operability using a touch panel, Japanese Patent Application Laid-open No. 2006-134090, for example, discloses technology that makes it possible to display input buttons in easy-to-use locations, thereby improving operability.

The invention disclosed in the above-mentioned Japanese Patent Application Laid-open No. 2006-134090 stops at displaying the various types of input buttons in locations that are easy for the user to use, and fails to take into account the following problems when inputting a character.

That is, since the human finger is generally relatively larger than the apparatus input button, the character display and hold-down area for inputting must be enlarged.

However, since the size of the display screen is limited, displaying this character in a large size for inputting makes it impossible to make space for other information, such as, for example, the display of an inputted character. Accordingly, the problem is that operability is lost.

SUMMARY OF THE INVENTION

Accordingly, an object of the present invention is to provide a character input apparatus and a character input method having good input operability for a device that displays selected objects, such as a touch panel.

A character input apparatus related to the present invention has a displaying unit for overlappingly displaying a character selection screen that displays character selection information for accepting a character input from a user and a character display area that displays a character selected from the character selection screen; a detecting unit for detecting a finger of the above-mentioned user; and a controlling unit for controlling the above-mentioned displaying unit so as to display the above-mentioned character display area in a location that does not overlap with the finger of the above-mentioned user, the location of which has been detected by the above-mentioned detecting unit.

A character input method related to the present invention has a display step of overlappingly displaying a character selection screen that displays character selection information for accepting a character input from a user and a character display area that displays a character selected from the character selection screen; a detection step of detecting a finger of the above-mentioned user; and a control step of executing control so as to display the above-mentioned character display area in a location that does not overlap with the finger of the above-mentioned user, the location of which has been detected in the above-mentioned detection step.

According to the present invention, it is possible to secure an area for displaying a character inputted in a location that is not obstructed by the operating finger after fully ensuring the size of the character in the character selection screen by moving the character display area to the optimum location in accordance with the movement of the finger. It is thereby possible to enhance input operability.

In the character input apparatus related to the present invention, it is preferable that detecting unit detect the finger of the user by using an optical touch panel. By using this configuration, it is possible to detect the finger of the user without the finger of the user making contact with displaying unit.

In the character input apparatus related to the present invention, it is preferable that detecting unit detect the finger of the user by tracking the eye-gaze of the user. By using this configuration, it is possible to detect the location of the finger of the user in accordance with the eye-gaze of user, making it possible to display the character display area in accordance with the location of the this finger.

The character input apparatus related to the present invention has a converting unit for carrying out kanji conversion processing for a character that has been displayed in the above-mentioned character display area, and it is preferable that the above-mentioned controlling unit execute control such that a character displayed in the character display area is cleared when the above-mentioned converting unit carries out conversion processing.

By using this configuration, it is possible to clear a character displayed in the character display area when conversion processing is carried out for an inputted character. Accordingly, a pre-conversion unconfirmed character is displayed in the character display area, making it possible for the user to discern the pre-conversion unconfirmed character, thereby enhancing operability.

In the character input apparatus related to the present invention, it is preferable that controlling unit also control the above-mentioned displaying unit so as to display the above-mentioned character display area in a location that is near the finger of the user. By using this configuration, it is possible to further enhance operability without the need to alter eye-gaze for the sake of operation.

According to the present invention, it becomes possible to display a character inputted with good operability in a location that is not obstructed by the finger of the user after fully ensuring the size of the character selection information displayed on the character selection screen.

DESCRIPTION OF THE PREFERRED EMBODIMENTS

Figure 1:
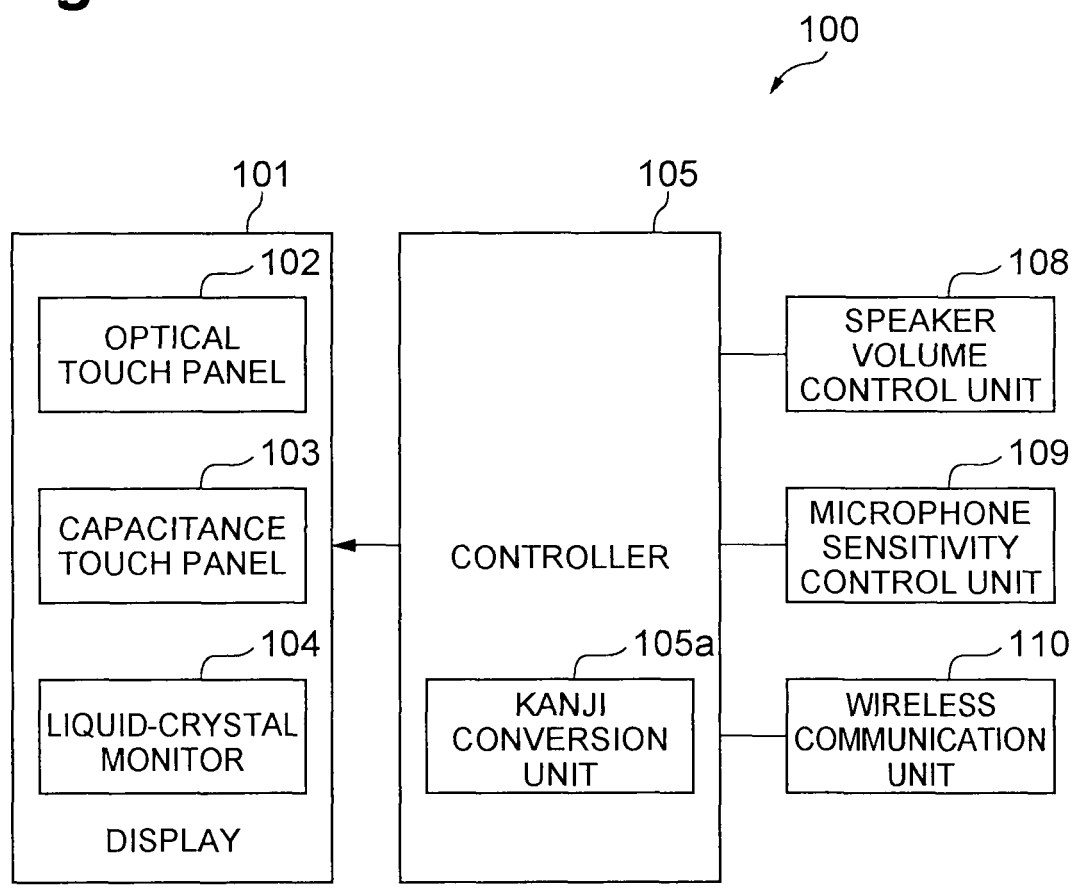
FIG. 1 is a block diagram of a mobile telephone comprising a character input apparatus of a first embodiment.

The character input apparatus and the character input method related to the present invention will be explained by referring to the drawings.

FIG. 1 is a block diagram of a mobile telephone comprising the character input apparatus related to a first embodiment.

As shown in FIG. 1, the mobile telephone 100 comprises a display 101 as displaying unit and detecting unit, and a controller 105 as controlling unit. This display 101 comprises an optical touch panel 102 as detecting unit, a capacitance touch panel 103 as detecting unit, and a liquid crystal monitor 104 as displaying unit. The controller 105 comprises a kanji conversion unit 105a as converting unit.

The mobile telephone 100 further comprises a speaker volume controller 108, a microphone sensitivity controller 109, and a wireless communication unit 110.

Furthermore, the scope of application of the character input apparatus related to the present invention is not limited to a mobile telephone, and, for example, the character input apparatus is also applicable to an automatic teller machine (ATM) or car navigation system having a display with a small surface area.

The display 101 is the user interface portion, and has (1) a function for detecting the location of the user's finger on the display even when the finger is not touching the display; (2) a function for detecting the location of the user's finger on the display when the finger touches the display; and (3) a function for displaying various information and 10 keys.

Figure 2:
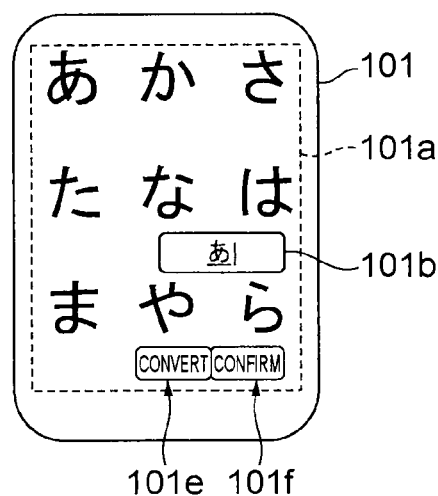
FIG. 2 is a diagram showing the display contents of the display of the first embodiment.

FIG. 2 shows the configuration of a screen displayed in the display 101.

A character selection screen 101a is a screen via which the user inputs a character. This character selection screen 101a is displayed comprising characters constituting input targets, which is a plurality of character selection information. A character display area 101b is an area in which a character being inputted (a pre-conversion unconfirmed character) is displayed. As shown in FIG. 2, the character selection screen 101a and the character display area 101b are displayed overlappingly.

In the following description, a case in which the user's finger touches a location on the capacitance touch panel 103 corresponding to the location of a button displayed on the character selection screen 101a will be described as "pressing" this button, and this button, which is being pressed, will be described as the "selected button". The controller 105 is able to obtain information as to which button has been pressed by checking the location of the finger detected by the capacitance touch panel 103, and the type of button on the character selection screen 101a that is displayed in the corresponding location.

When the user wishes to input the character "あ", he presses the "あ" button one time. In this case, the character "あ" is depicted as the "selected character". When the users inputs "い", "う", "え" or "お", the "あ" button is respectively pressed from one to four times. In accordance with this, the character "い", "う", "え" or "お" is depicted as the "selected character".

Figure 3:
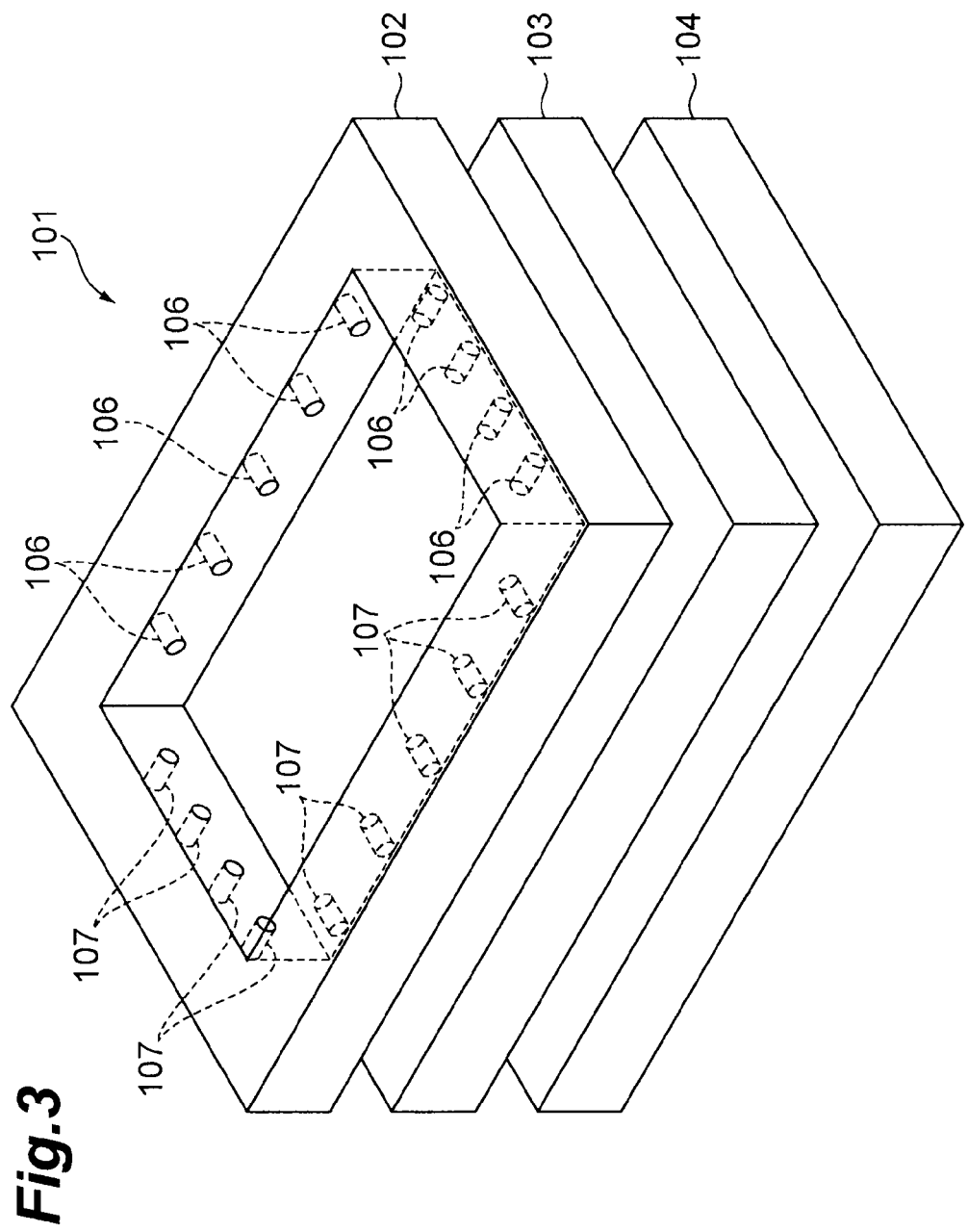
FIG. 3 is a schematic diagram of the structure of the display of the first embodiment.

FIG. 3 schematically shows the structure of the display 101. A capacitance touch panel 103 is arranged on the upper surface side of the liquid crystal monitor 104, and an optical touch panel 102 is arranged superiorly to the capacitance touch panel 103.

The optical touch panel 102 is configured from light-emitting elements 106 that emit light, and light-receiving elements 107 that receive the light emitted from the light-emitting elements 106. More specifically, light-emitting elements 106 and light-receiving elements 107 are arranged opposite one another on the sides of the rectangularly configured optical touch panel 102 in the vertical and horizontal directions, respectively. In addition, the intersecting points of the optical paths formed by the light-emitting elements 106 and the light-receiving elements 107 are arranged so as to form a lattice on the upper surface side of the capacitance touch panel 103. Then, when the user's finger obstructs the light, the location of this point of intersection is detected, and the result of this detection is sent to the controller 105. By using a configuration like this, it is possible to detect the location of the user's finger in a state in which the user's finger is not touching the capacitance touch panel 103.

The capacitance touch panel 103 has a pair of electrodes that are arranged facing one another across a suitable gap, and is a type of touch panel in which a voltage is applied across these electrodes, the location of the user's finger is detected by using the change in the capacitance between the electrodes in accordance with the location at which the user's finger is touching the panel, and the location of the detected user's finger is sent to the controller 105.

The liquid-crystal monitor 104, under the control of the controller 105, displays the character selection screen 101a, the character display area 101b, a convert button 101e and a confirm button 101f. Furthermore, an input character, which has been confirmed in accordance with the input apparatus related to the present invention, may be displayed on the liquid-crystal monitor 104 as the character.

The light-emitting element 106 is a light source, and, for example, may utilize an infrared light-emitting diode or the like.

The light-receiving element 107 is the part that receives the light from the light-emitting element 106, and, for example, may utilize a phototransistor.

Furthermore, there are various methods of arraying the light-emitting elements 106 and the light-receiving elements 107, and any array method is possible as long as it enables the detection of a finger.

The controller 105 is equivalent to a not-shown CPU (Central Processing Unit) that is provided on the inside of the mobile telephone 100, and is the part that controls the optical touch panel 102, the capacitance tough panel 103, the liquid-crystal monitor 104, the speaker volume control unit 108, the microphone sensitivity control unit 109 and the wireless communication unit 110, and displays the character selection screen 101a on the liquid-crystal monitor 104, displays the character display area 101b in the display location determined on the basis of the location of the user's finger, and displays the user-selected character in the character display area 101b.

The controller 105 also starts up the optical touch panel 102 to serve as a sensor, sends a conversion instruction and pre-conversion character to the kanji conversion unit 105a when the user requests a kanji conversion, carries out processing to clear the character display area when the user requests a confirmation, and also ends the operation of the sensor.

The kanji conversion unit 105a determines conversion candidates and their priorities based on the pre-conversion character.

The speaker volume control unit 108 controls the incoming call melody.

The microphone sensitivity control unit 109 controls a call.

The wireless communication unit 110 carries out communications with a not-shown communication network.

Figure 4:
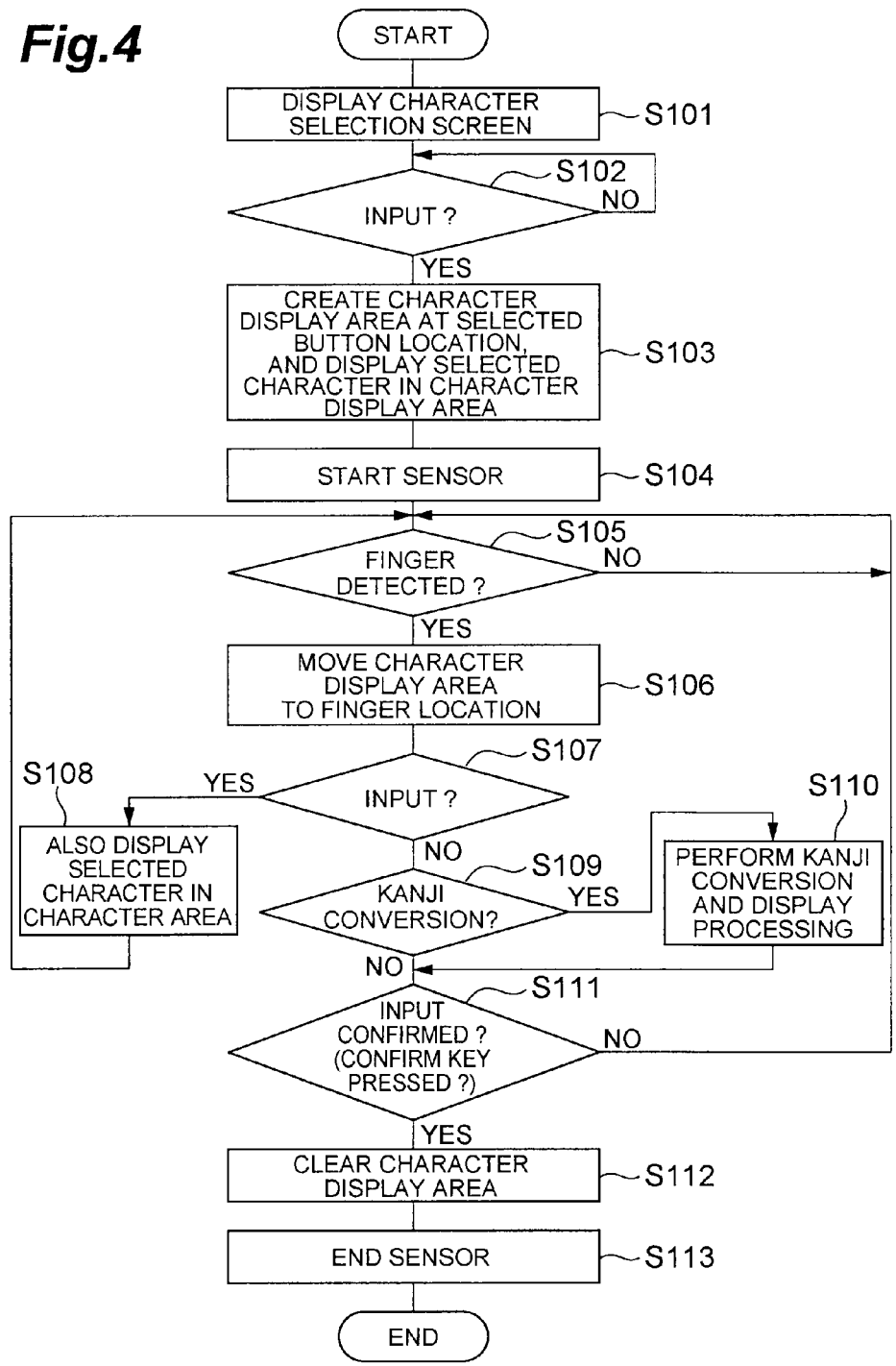
FIG. 4 is a flowchart showing the processing of the character input apparatus of the first embodiment.

Next, the flow of processing of the character input apparatus related to this embodiment will be explained by referring to FIG. 4.

The start of the processing flow for the character input apparatus related to this embodiment is the point in time at which the mobile telephone comprising the character input apparatus related to this embodiment is waiting for a character to be inputted by the user. For example, in a case where an e-mail message is to be created on the mobile telephone, it is the point in time when the user starts the email text edit function, and the mobile telephone transitions to the character input waiting state for a user-created text.

The character selection screen 101a is displayed on the liquid-crystal monitor 104 under the control of the controller 105 (Step S101).

When the controller 105 detects the fact that a button has been pressed by the user (Step S102: Yes), the character display area 101b is created under the control of the controller 105 in the vicinity of the selected button, and the controller 105 displays the character selected by the user in the character display area 101b (Step S103).

Under the control of the controller 105, the optical touch panel 102 is started up as a sensor (Step S104).

When a finger is detected by the optical touch panel 102 (Step S105: Yes), the display location of the character display area 101b is moved under the control of the controller 105 in accordance with the location of this detected user finger (Step S106).

The method of moving the character display area 101b in accordance with the location of the user's finger will be explained in detail further below.

When a button is pressed by the user (S107: Yes), the controller 105 also displays the selected character in the character display area 101b (Step S108).

In a case where there is no input (Step S107: No), the controller 105 checks whether or not there was a kanji conversion request from the user (Step S109).

In this embodiment, a convert button 101e is displayed on the liquid-crystal monitor 104 under the control of the controller 105, and the controller 105 determines that a kanji conversion has been requested when the user presses this convert button.

When there has been a kanji conversion request (Step S109: Yes), the controller 105 sends a conversion instruction and a pre-conversion character to the kanji conversion unit 105a. The kanji conversion unit 105a determines the conversion candidates and their priorities from the pre-conversion character in accordance with this instruction, and the conversion candidate with the highest priority of these determined conversion candidates is displayed in the character display area 101b under the control of the controller 105 (Step S110).

When there has not been a kanji conversion request (Step S109: No), the controller 105 checks whether or not there has been a confirmation request from the user (Step S111).

In this embodiment, a confirm button is displayed on the liquid-crystal monitor 104 under the control of the controller 105, and the controller 105 determines that a confirmation has been requested when the user has pressed the confirm button. In addition, a determination that an input has been confirmed may be made when either the predictive conversion key or the no-conversion key is pressed.

When an input has been confirmed (Step S111: Yes), the controller 105 holds the character that is being displayed in the character display area 101b, clears the character display area 101b, and displays this held input character in the not-shown e-mail text (Step S112).

Next, sensing by the optical touch panel 102 is terminated under the control of the controller 105 (Step S113), and processing ends.

Figure 5:
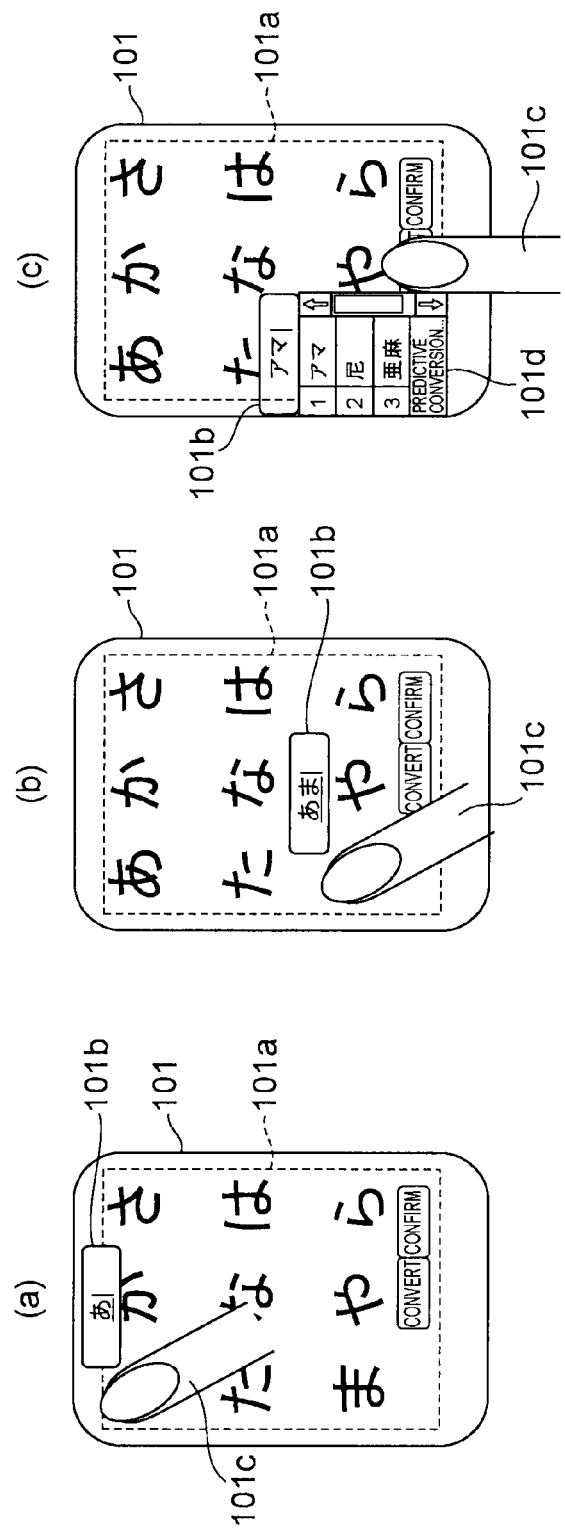
FIG. 5 is a state transition diagram of the contents displayed on the display of the first embodiment.

FIG. 5 is a state transition diagram of the character input apparatus of this embodiment.

A conversion candidate list 101d is a list that displays the conversion candidates and priorities determined by the kanji conversion unit 105a.

101c is the user's finger.

When the user presses the "あ" button, the character display area 101b is formed in the vicinity of the selected "あ" button under the control of the controller 105 ((a) of FIG. 5).

When the user moves his finger to the location of the "ま" button on the character selection screen 101a, the controller 105 moves the character display area 101b in accordance with the movement of the finger even when the finger is not touching the display 101. When the user presses the "ま" button, the controller 105 also displays the selected character "ま" in the character display area 101b ((b) of FIG. 5).

When the user presses the convert button 101e, a kanji conversion process is performed. In this embodiment, the controller 105 displays conversion candidates corresponding to "あま", which are the current input characters, in descending order of priority in the conversion candidate list 101d, and displays the highest priority candidate ("アマ" in the example shown in FIG. 5) in the character display area 101b ((c) of FIG. 5). The priority may be obtained by a not-shown data storage unit, which corresponds to a not-shown nonvolatile RAM (Random Access Memory) provided on the inside of the mobile telephone, storing a history of conversions made by the user to date, and the controller 105 determining the order of the conversion candidates based on this conversion history beginning with the conversion candidate having the highest percentage of conversions.

Overlapping the displays of the character selection screen 101a and the character display area 101b like this enables the size of the characters in the character selection screen 101a to be enlarged to the maximum, making it possible to reduce input errors and to enhance user operability.

The relationship between the location of a detected user finger and the location of the character display area 101b will be described here by referring to FIGS. 6 and 7.

Figure 6:
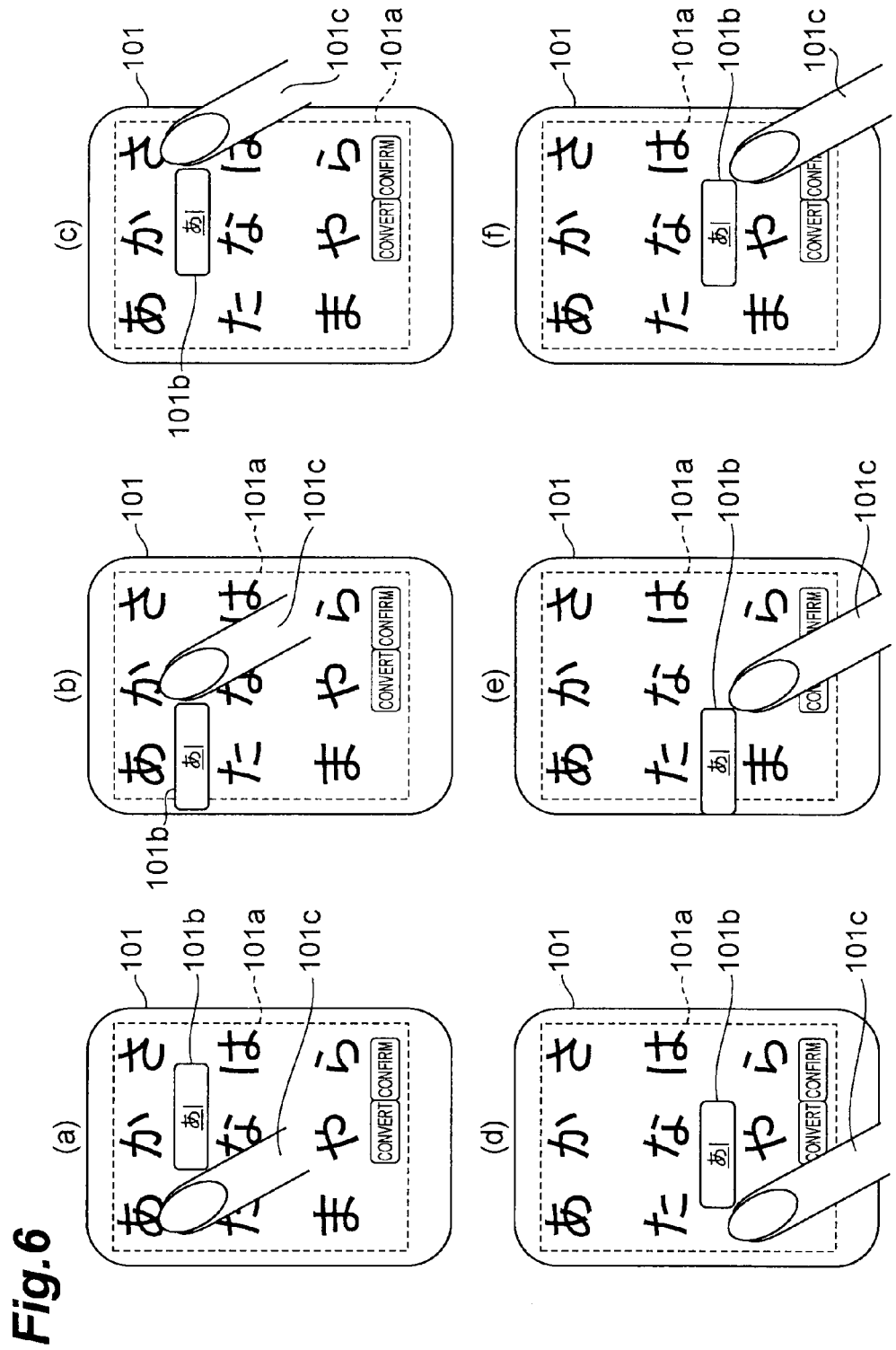
FIG. 6 is a diagram showing the relationship between the location of a user's finger and the display location in the character display area.
Figure 7:
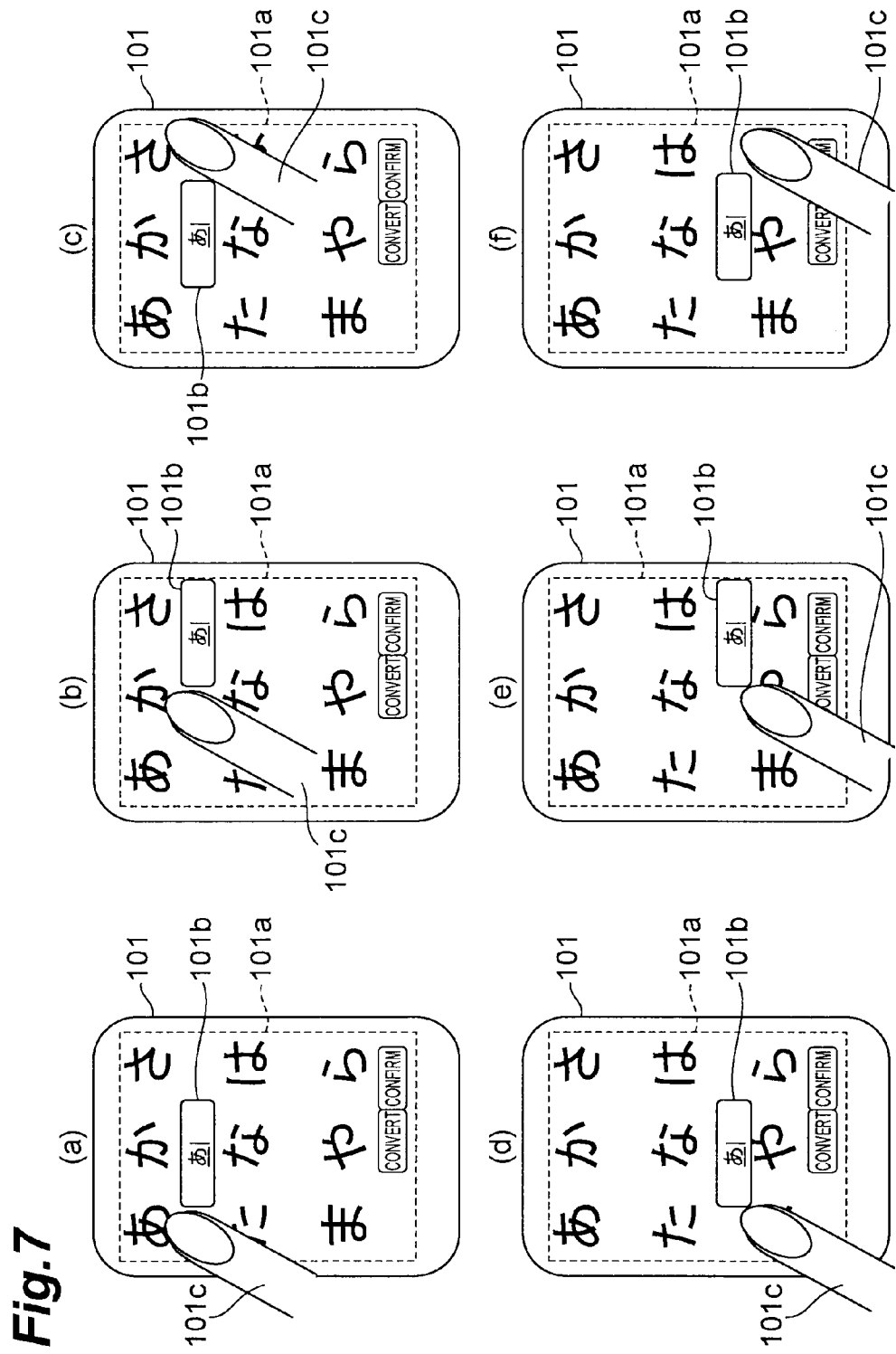
FIG. 7 is a diagram showing the relationship between the location of the user's finger and the display location in the character display area.

FIG. 6 is a case in which the user is inputting a character using his right hand, and FIG. 7 is a case in which the user is inputting a character using his left hand. It is possible to obtain information as to which hand will be used for inputting by registering this information beforehand. In accordance with this, the user inputs the information as to whether he will perform an input operation with his right hand or his left hand using a not-shown operation unit, and the controller 105 executes control in accordance with the information from the operation unit.

As shown in (a) of FIG. 6, in a case where the user is inputting with his right hand and the user's finger is positioned either near the "あ" button or in the vicinity between the "あ" button and the "た" button on the character selection screen 101a, it is preferable that the left edge of the character display area 101b be displayed in a location that is to the right of the finger and at a distance of around 1 cm from the center of the finger.

As shown in (b) of FIG. 6, in a case where the user is inputting with his right hand and the user's finger is positioned either near the "か" button or in the vicinity between the "か" button and the "な" button on the character selection screen 101a, it is preferable that the right edge of the character display area 101b be displayed in a location that is to the left of the finger and at a distance of around 1 cm from the center of the finger.

As shown in (c) of FIG. 6, in a case where the user is inputting with his right hand and the user's finger is positioned either near the "さ" button or in the vicinity between the "さ" button and the "さ" button on the character selection screen 101a, it is preferable that the right edge of the character display area 101b be displayed in a location that is to the left of the finger and at a distance of around 1 cm from the center of the finger.

As shown in (d) of FIG. 6, in a case where the user is inputting with his right hand and the user's finger is positioned near the "ま" button on the character selection screen 101a, it is preferable that the lower left corner of the character display area 101b be displayed in a location that is to the upper right of the finger and at a distance of around 1 cm from the center of the finger.

As shown in (e) of FIG. 6, in a case where the user is inputting with his right hand and the user's finger is positioned near the "や" button on the character selection screen 101a, it is preferable that the lower right corner of the character display area 101b be displayed in a location that is to the upper left of the finger and at a distance of around 1 cm from the center of the finger.

As shown in (f) of FIG. 6, in a case where the user is inputting with his right hand and the user's finger is positioned near the "ら" button on the character selection screen 101a, it is preferable that the lower right corner of the character display area 101b be displayed in a location that is to the upper left of the finger and at a distance of around 1 cm from the center of the finger.

As shown in (a) of FIG. 7, in a case where the user is inputting with his left hand and the user's finger is positioned either near the "あ" button or in the vicinity between the "あ" button and the "た" button on the character selection screen 101a, it is preferable that the left edge of the character display area 101b be displayed in a location that is to the right of the finger and at a distance of around 1 cm from the center of the finger.

As shown in (b) of FIG. 7, in a case where the user is inputting with his right hand and the user's finger is positioned either near the "か" button or in the vicinity between the "か" button and the "な" button on the character selection screen 101a, it is preferable that the left edge of the character display area 101b be displayed in a location that is to the right of the finger and at a distance of around 1 cm from the center of the finger.

As shown in (c) of FIG. 7, in a case where the user is inputting with his left hand and the user's finger is positioned either near the "さ" button or in the vicinity between the "さ" button and the "は" button on the character selection screen 101a, it is preferable that the right edge of the character display area 101b be displayed in a location that is to the left of the finger and at a distance of around 1 cm from the center of the finger.

As shown in (d) of FIG. 7, in a case where the user is inputting with his left hand and the user's finger is positioned near the "ま" button on the character selection screen 101a, it is preferable that the lower left corner of the character display area 101b be displayed in a location that is to the upper right of the finger and at a distance of around 1 cm from the center of the finger.

As shown in (e) of FIG. 7, in a case where the user is inputting with his left hand and the user's finger is positioned near the "や" button on the character selection screen 101a, it is preferable that the lower right corner of the character display area 101b be displayed in a location that is to the upper right of the finger and at a distance of around 1 cm from the center of the finger.

As shown in (f) of FIG. 7, in a case where the user is inputting with his left hand and the user's finger is positioned near the "ら" button on the character selection screen 101a, it is preferable that the lower right corner of the character display area 101b be displayed in a location that is to the upper left of the finger and at a distance of around 1 cm from the center of the finger.

By the controller 105 using the methods shown in FIGS. 6 and 7 to control the relationship of the location of the user's finger and the location of the character display area 101b, it becomes possible to display an input character in a location, which is not concealed by the finger, and which does not require the user to shift his eye-gaze.

Next, the working and effect of the mobile telephone 100 related to this embodiment will be explained. In the mobile telephone 100 related to this embodiment, the controller 105 moves the display location of the character display area 101b in accordance with the location of the user's finger, thereby making it possible to display an input character in a location, which is not concealed by the finger, and which does not require the user to shift his eye-gaze. Further, overlapping the displays of the character selection screen 101a and the character display area 101b enables the display surface area of the character selection screen 101a to be enlarged to the maximum, making it possible to reduce input errors and to enhance user operability.

Next, a second embodiment of the present invention will be explained.

Figure 8:
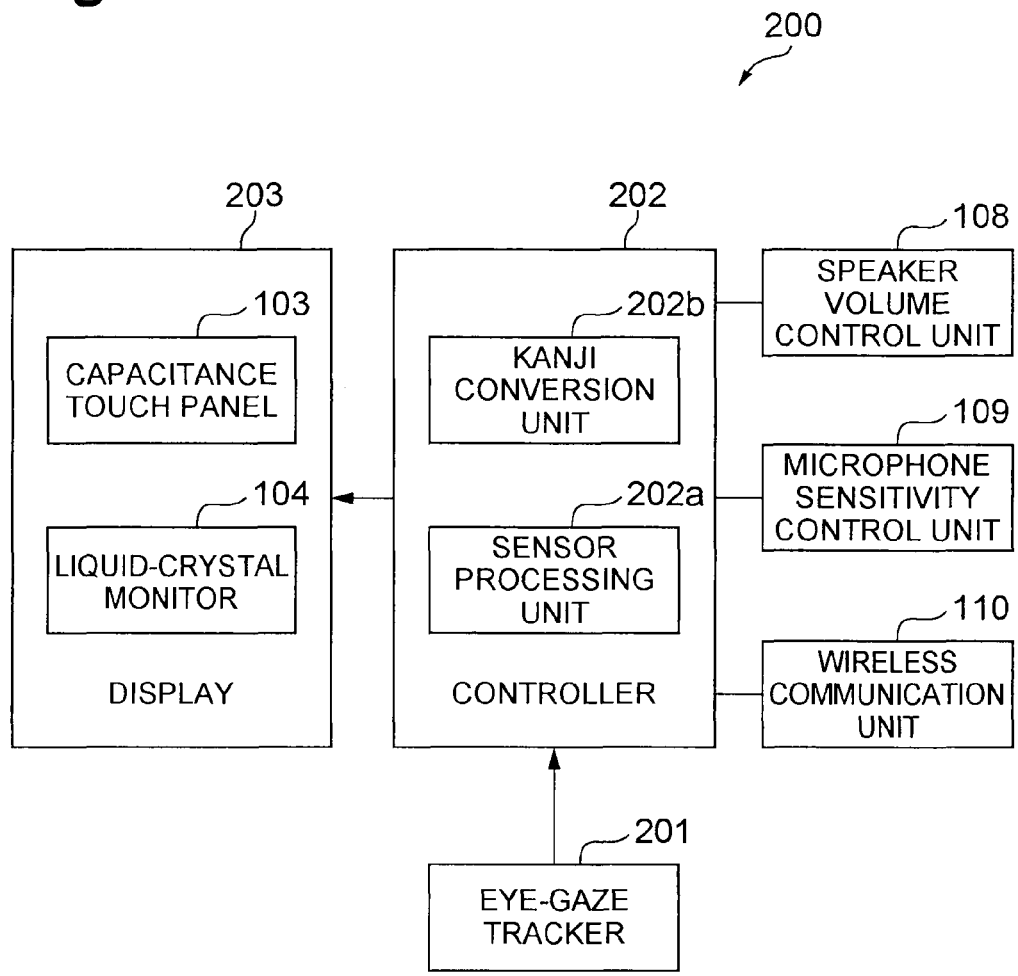
FIG. 8 is a block diagram of a mobile telephone comprising a character input apparatus of a second embodiment.
Figure 9:
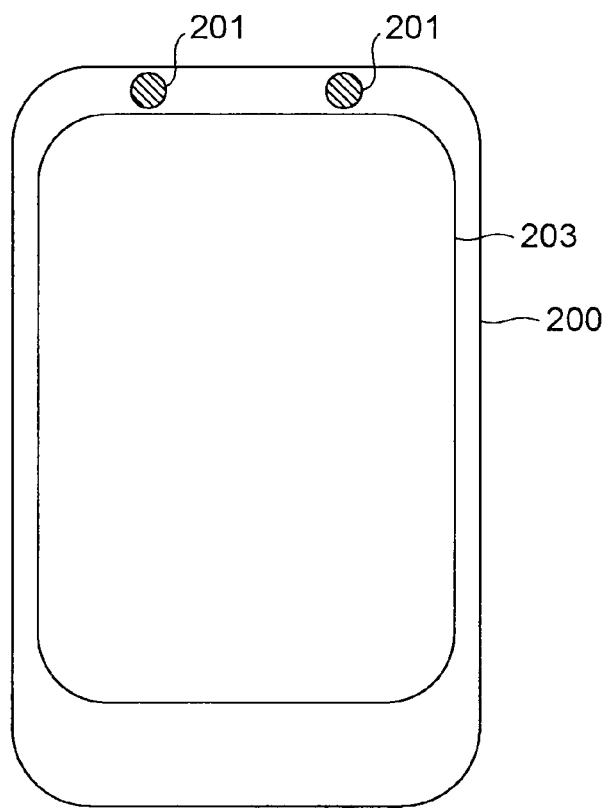
FIG. 9 is a diagram illustrating the location of the eye-gaze tracker on the input character apparatus of the second embodiment.

FIG. 8 is a block diagram of a mobile telephone comprising a character input apparatus of a second embodiment.

As shown in FIG. 8, a mobile telephone 200 comprises an eye-gaze tracker 201 as a detector; a controller 202 as controlling unit and converting unit; and a display 203 as displaying unit and detecting unit. The controller 202 comprises a sensor processing unit 202a, and a kanji conversion unit 202b as converting unit. The display 203 comprises a capacitance touch panel 103 as detecting unit, and a liquid-crystal monitor 104 as displaying unit.

The mobile telephone 200 further comprises the speaker volume control unit 108; the microphone sensitivity control unit 109; and the wireless communication unit 110.

The eye-gaze tracker 201 has a function for tracking the eye-gaze of the user by controlling the sensor processing unit 202a. Specifically, an infrared irradiation diode and an eye camera are integrated together, the location of the eyeball and a reflection from the pupil of the eye are detected in accordance with the infrared irradiation, and the result of this detection is sent to the sensor processing unit 202a.

The controller 202 is the part that controls the eye-gaze tracker 201, the capacitance touch panel 103, the liquid-crystal monitor 104, the speaker volume control unit 108, the microphone sensitivity control unit 109, and the wireless communication unit 110, displaying the character selection screen 101a on the liquid-crystal monitor 104, determining the display location and displaying the character display area 101b based on the location of the user's eye-gaze, and displaying a selected character in the character display area 101b.

In addition, the controller 202 starts up the eye-gaze tracker 201 as a sensor, carries out kanji conversion processing when the user requests a kanji conversion, clears the character display area 101b when the user requests a confirmation, and ends the operation of the sensor.

The sensor processing unit 202a is able to analyze the eyeball location and pupil reflection information sent from the eye-gaze tracker 201, and track the eye-gaze of the user.

The kanji conversion unit 202b determines the conversion candidates and priorities thereof from the pre-conversion character.

The method for determining the display location of the character display area 101b in the second embodiment will be described here. When a user, who is attempting to input a character, inputs "あ", he will normally shift his eye-gaze to the "あ" button to confirm the location of the "あ" button. Thereafter or simultaneously thereto, the user moves the finger to be used for inputting to the "あ" button. Therefore, in this embodiment, the controller 202 determines the location of the user's eye-gaze measured in accordance with the sensor processing unit 202a as the location of the user's finger. The controller 202 uses the methods explained using FIGS. 6 and 7 to determine the display location of the character display area 101b based on this determined user-finger location.

The display 203 is the user interface part, and has (1) a function for detecting the location on the display touched by the user's finger, and (2) a function for displaying various information and 10 keys.

The capacitance touch panel 103 has a pair of electrodes that are arranged facing one another across a suitable gap, and is a type of touch panel in which a voltage is applied across these electrodes, the location of the user's finger is detected by using the change in the capacitance between the electrodes in accordance with the location where the user's finger is touching the panel, and the location of the detected user's finger is sent to the controller 202.

The liquid-crystal monitor 104, under the control of the controller 202, displays the character selection screen 101a, the character display area 101b, the convert button 101 e and the confirm button 101f. Furthermore, an input character, which has been confirmed in accordance with the input apparatus related to the present invention, may be displayed in the liquid-crystal monitor 104 as the character.

Figure 10:
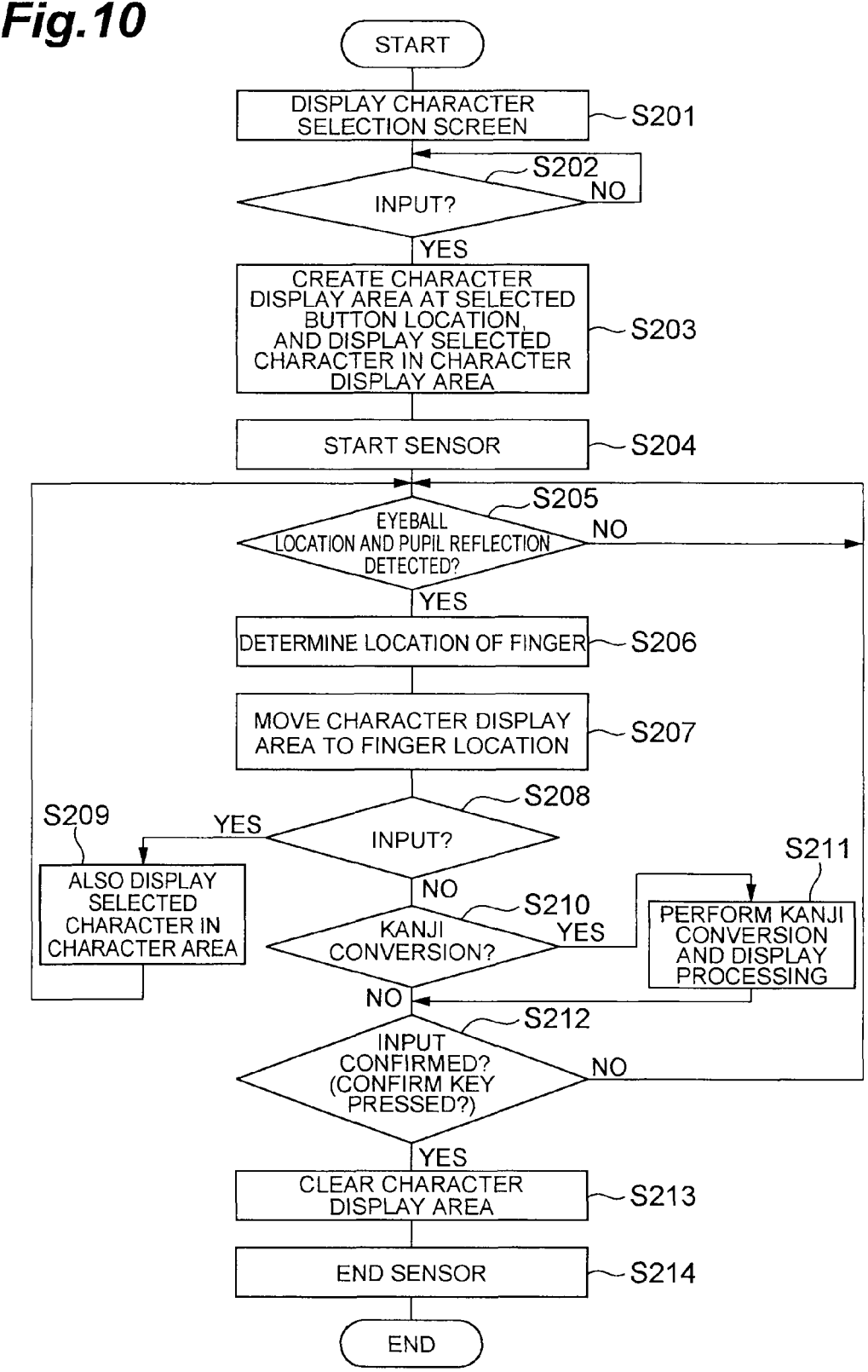
FIG. 10 is a flowchart showing the processing of the character input apparatus of the second embodiment.

Next, the processing flow of the character input apparatus related to this embodiment will be explained by referring to FIG. 10. Those parts that are identical to the above-described first embodiment will not be explained here; the description will focus on the points of difference.

The processing of Steps S201 through S203 is the same as that of the first embodiment.

In this embodiment, the eye-gaze tracker 201 is utilized to detect the location of the user's finger, and the controller 202 starts up the eye-gaze tracker 201 as a sensor (Step S204).

When the location of the user's eyeball and the pupil reflection are detected by the eye-gaze tracker 201 (Step S205: Yes), the sensor processing unit 202a tracks the eye-gaze of the user from the user eyeball location and the pupil reflection information sent from the eye-gaze tracker 201. The controller 202 determines this tracked user's eye-gaze location to be the location of the user's finger (Step S206).

The processing of Steps S207 through S214 is the same as that of the first embodiment.

Figure 11:
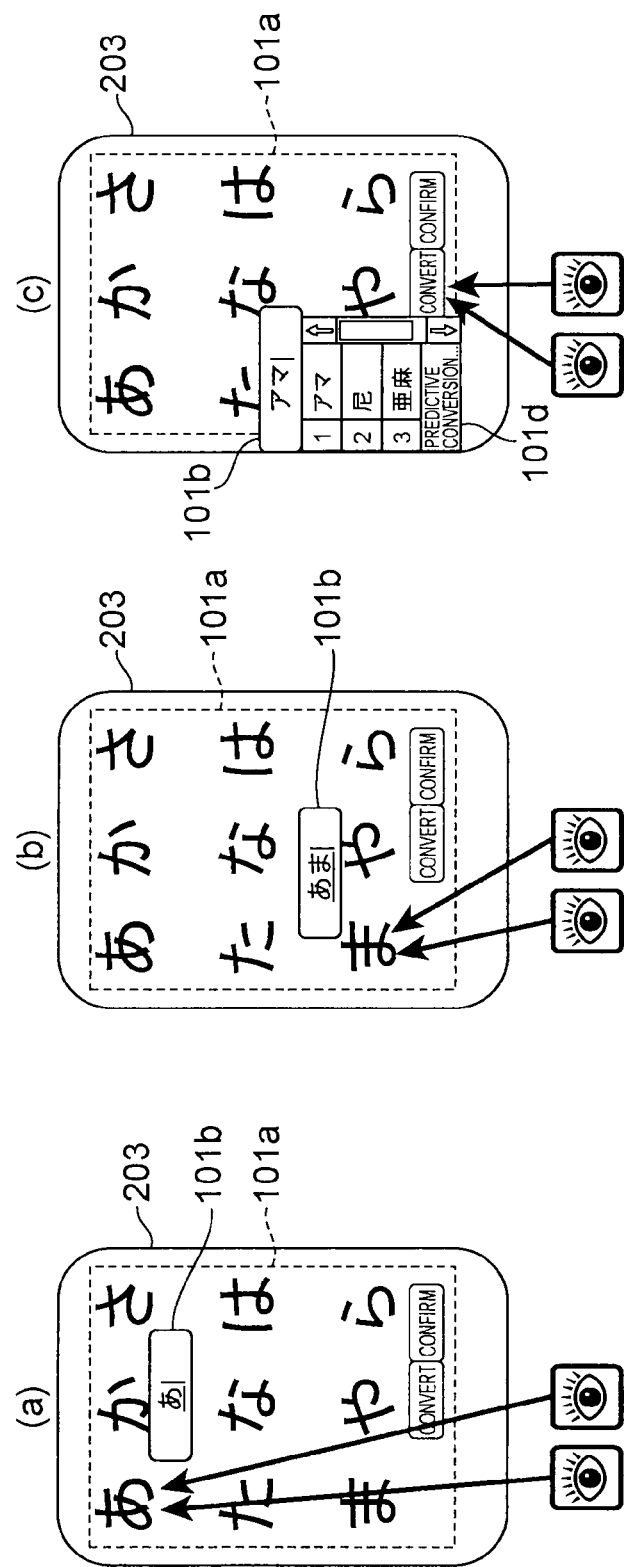
FIG. 11 is a state transition diagram of the contents displayed on the display of the second embodiment.

FIG. 11 is a state transition diagram of the screen in this embodiment. The user's finger 101c has been omitted from this diagram.

When the user presses the "あ" button, the controller 202 creates the character display area 101b in the vicinity of this selected "あ" button, and displays the selected character "あ" in this character display area 101b. The user's eye-gaze is considered to be in the vicinity of the "あ" button ((a) of FIG. 11) to confirm the location of the "あ" button at this time. Next, when the user shifts his eye-gaze to the location of the "ま" button on the character selection screen 101a in order to input "ま", the controller 202 moves the location of the character display area 101b in accordance therewith. When the user presses the "ま" button, the controller 202 also displays the selected character "ま" in the character display area 101b ((b) of FIG. 11). Next, when the user shifts his eye-gaze to the convert button to carry out a conversion, the controller 202 moves the character display area 101b in accordance therewith. When the user presses the convert button, a kanji conversion process is performed. In this embodiment, the controller 202 displays conversion candidates corresponding to "あま", which are the current input characters, in descending priority in the conversion candidate list 101d, and displays the candidate having the highest priority ("アマ" in the example shown in FIG. 11) in the character display area 101b ((c) of FIG. 11).

As shown in FIG. 11, in the mobile telephone 200 comprising the character input apparatus related to this embodiment, the character display area 101b is moved in accordance with the locations of the user's eye-gaze and finger under the control of the controller 202.

Next, the working and effect of the mobile telephone 200 comprising the character input apparatus related to this embodiment will be explained. In the mobile telephone 200 comprising the character input apparatus related to this embodiment, the controller 202 moves the character display area 101b in accordance with the locations of the user's eye-gaze and finger, thereby making it possible to display an input character in a location, which is not concealed by the finger, and which does not require the user to shift his eye-gaze. Further, overlapping the displays of the character selection screen 101a and the character display area 101b enables the display surface area of the character selection screen 101a to be enlarged to the maximum, making it possible to reduce input errors and to enhance user operability.

In the first embodiment described hereinabove, since the character display area 101b is moved in accordance with the user's finger, for example, in a case where an experienced user is already shifting his eye-gaze to the "ま" button that he intends to press next while pressing the "あ" button, a situation in which the locations of the eye-gaze and character display area 101b deviate is conceivable. However, since the user's finger location is determined from the location of the user's eye-gaze in this embodiment, an effect that makes it possible to further reduce the deviation of the locations of the eye-gaze and character display area 101b is achievable.

In the first embodiment described hereinabove, since an optical touch panel 102 is utilized to detect the user's finger, it is conceivable that the user's finger will not be able to be detected unless the user's finger is within a fixed distance from the touch panel. However, since the user's finger location is determined from the location of the user's eye gaze in this embodiment, it is possible to achieve an effect that enables the user's finger location to be determined if the location of the user's eyeball and the reflection from the pupil are tracked by the eye-gaze tracker 201.

What is claimed is:

1. A character input apparatus comprising:
   a displaying unit that overlappingly displays a character selection screen that displays character selection information for accepting a character input from a user and a character display area that displays a character selected from the character selection screen;
   a detecting unit that detects a finger of the user by tracking the eye-gaze of the user; and
   a controlling unit that controls the displaying unit so as to display the character display area in a location that does not overlap with the finger of the user, the location of which has been detected by the detecting unit.

2. The character input apparatus according to claim 1, further comprising:
   a converting unit that carries out kanji conversion processing for a character that has been displayed in the character display area, wherein the controlling unit executes control such that a character that has been displayed in the character display area is cleared when the converting unit carries out conversion processing.

3. The character input apparatus according to claim 1, wherein the controlling unit also controls the displaying unit so as to display the character display area in a location that is near the finger of the user.

4. A character input method, comprising:
   overlappingly displaying a character selection screen that displays character selection information for accepting a character input from a user and a character display area that displays a character selected from the character selection screen;
   detecting a finger of the user by tracking the eye-gaze of the user; and
   executing control so as to display the character display area in a location that does not overlap with the finger of the user, the location of which has been detected.

5. The character input apparatus according to claim 1, further comprising:
   a converting unit that carries out conversion processing for a character that has been displayed in the character display area, wherein the controlling unit executes control such that a character that has been displayed in the character display area is cleared when the converting unit carries out conversion processing.

* * * * *